(12) United States Patent
Cote, Jr.

(10) Patent No.: US 7,112,231 B2
(45) Date of Patent: *Sep. 26, 2006

(54) CLUTCH FILTER AND METHOD FOR ASSEMBLY

(75) Inventor: Edmond H. Cote, Jr., Edgewater, FL (US)

(73) Assignee: Honeywell International, Inc., Morristown, NJ (US)

( * ) Notice: Subject to any disclaimer, the term of this patent is extended or adjusted under 35 U.S.C. 154(b) by 171 days.

This patent is subject to a terminal disclaimer.

(21) Appl. No.: 10/841,343

(22) Filed: May 7, 2004

(65) Prior Publication Data

US 2004/0206059 A1 Oct. 21, 2004

Related U.S. Application Data

(63) Continuation-in-part of application No. 10/104,908, filed on Mar. 22, 2002, now Pat. No. 6,783,564.

(51) Int. Cl.
*B01D 50/00* (2006.01)
*B01D 53/34* (2006.01)

(52) U.S. Cl. ............... 55/385.3; 55/385.1; 55/DIG. 28; 55/DIG. 30; 123/198 E; 60/278; 60/279; 60/297; 60/311; 422/179; 422/180

(58) Field of Classification Search ............... 55/385.1, 55/385.3, DIG. 28, DIG. 30; 123/198 E; 60/278, 279, 297, 311; 422/179, 180
See application file for complete search history.

(56) References Cited

U.S. PATENT DOCUMENTS

| | | | |
|---|---|---|---|
| 3,910,770 A | 10/1975 | Kobylinski et al. | |
| 4,264,344 A | 4/1981 | Ludecke et al. | |
| 4,300,924 A | 11/1981 | Coyle | |
| 4,393,652 A | 7/1983 | Munro | |
| 4,928,348 A | 5/1990 | Clayton | |
| 5,013,340 A | 5/1991 | Taslim et al. | |
| 5,043,147 A | 8/1991 | Knight | |
| 5,102,431 A | 4/1992 | Barry | |
| 5,376,341 A | 12/1994 | Gulati | |
| 5,557,923 A | 9/1996 | Bolt et al. | |
| 6,012,285 A | 1/2000 | Lutz et al. | |
| 6,062,365 A | 5/2000 | Gochenour | |
| 6,098,773 A | 8/2000 | Blessinger et al. | |
| 6,576,045 B1 | 6/2003 | Liu et al. | |
| 6,598,388 B1 | 7/2003 | Lucas et al. | |

*Primary Examiner*—Duane Smith
*Assistant Examiner*—Minh-Chau T. Pham

(57) ABSTRACT

A clutch filter for filtering a fluid and a method for installing a filter member on the clutch filter are provided. The clutch filter includes a conduit member having an inlet end and an outlet end. The clutch filter further includes a filter member configured to be removably disposed about an exterior of the conduit member wherein an inner surface of the filter member and an exterior surface of the conduit member are in a spaced relationship. Finally, the clutch filter includes a collection vessel coupled to the outlet end of the conduit member. The collection vessel defines a first area in fluid communication with the outlet end. A second area is defined between the inner surface of the filter member and the exterior surface of the conduit member that is in fluid communication with the first area. A portion of the exterior surface of the filter member is not covered by the collection vessel. The collection vessel is configured to induce the fluid passing into the inlet end of the conduit member to change its flow direction in order to exit the clutch filter via the filter member and particulate solids in the fluid being either deposited in the first or second areas or filtered by the filter member.

34 Claims, 2 Drawing Sheets

CLUTCH FILTER AND METHOD FOR ASSEMBLY

CROSS REFERENCE TO RELATED APPLICATIONS

This application is a Continuation-In-Part of U.S. patent application Ser. No. 10/104,908, filed Mar. 22, 2002, now U.S. Pat. No. 6,783,564 B2, the contents of which are incorporated herein by reference thereto.

TECHNICAL FIELD

The present invention relates to a clutch filter and a method for installing a filter member on the clutch filter.

BACKGROUND

High-performance clutches are commonly used in racing cars, such as drag racers. Unfortunately, these clutches wear down relatively quickly during a race, and in the process, used friction material from the clutch disc is expelled from the vehicle, primarily in the form of particulate solids.

Particulate solids are composed of fine metallic and non-metallic particles, which are generated as clutch friction material rapidly wears away from the clutch. These particles are normally expelled from the clutch housing into the environment, and many of the particles eventually settle onto the track surface. The environment around a racing track and the track surface are both undesirable places to deposit this material.

Thus, there is a need for a filtering means for reducing or minimizing the release of particulate solids from racing cars. Further, there is a need for a filtering means that allows for easy replacement of a filtering media when the filtering media becomes substantially loaded with particulate solids.

SUMMARY OF THE INVENTION

A clutch filter for filtering a fluid in accordance with an exemplary embodiment is provided. The clutch filter includes a conduit member having an inlet end and an outlet end. The clutch filter further includes a filter member configured to be removably disposed about an exterior of the conduit member wherein an inner surface of the filter member and an exterior surface of the conduit member are in a spaced relationship. Finally, the clutch filter includes a collection vessel coupled to the outlet end of the conduit member. The collection vessel defines a first area in fluid communication with the outlet end. A second area is defined between the inner surface of the filter member and the exterior surface of the conduit member that is in fluid communication with the first area. A portion of the exterior surface of the filter member is not covered by the collection vessel. The collection vessel is configured to induce the fluid passing into the inlet end of the conduit member to change its flow direction in order to exit the clutch filter via the filter member and particulate solids in the fluid being either deposited in the first or second areas or filtered by the filter member.

A clutch filter in accordance with another exemplary embodiment is provided. The clutch filter includes conduit member having an inlet end and an outlet end. The clutch filter further includes a filter member having a substantially cylindrical filter media wherein the filter media is configured to be removably disposed about an exterior of the conduit member wherein an inner surface of the filter media and an exterior surface of the conduit member are in a spaced relationship. Finally, the clutch filter includes a collection vessel coupled to the outlet end of the conduit member, the collection vessel defining a first area in fluid communication with the outlet end. A second area is defined between the inner surface of the filter member and the exterior surface of the conduit member that is in fluid communication with the first area. A portion of the exterior of the filter member is not covered by the collection vessel. The collection vessel is configured to induce the fluid passing into the inlet end of the conduit member to change its flow direction in order to exit the clutch filter via the filter member and particulate solids in the fluid being either deposited in the first or second areas or retained by the filter member. Finally, the clutch filter includes an attachment means for fixedly attaching the filter member to the conduit member.

A method for installing a filter member in a clutch filter in accordance with another exemplary embodiment is provided. The clutch filter has a conduit member with an inlet end and an outlet end. The clutch filter further includes a collection vessel disposed about the outlet end of the conduit member. The collection vessel includes a first area in fluid communication with the outlet end, and a second area between an inner surface of the filter member and an exterior surface of the conduit member in fluid communication with the first area. The method includes disposing the filter member about the exterior surface of the conduit member in a spaced relationship, wherein a portion of an exterior surface of the filter member is not covered by the collection vessel, and the collection vessel being configured to induce a fluid passing into the inlet end of the conduit member to change its flow direction in order to exit the clutch filter via the filter member and particulate solids in the fluid being either deposited in the first or second areas or filtered by the filter member. Finally, the method includes affixing the filter member to the conduit member proximate the inlet end of the conduit member.

A fluid filter in accordance with another exemplary embodiment is provided. The fluid filter includes a conduit member having an inlet end and an outlet end. The fluid filter further includes a collection vessel secured to the outlet end. The collection vessel defines a receiving area wherein the receiving area is in fluid communication with the conduit member. Finally, the fluid filter includes at least one supporting member depending away from the collection vessel. The at least one supporting member is configured and positioned to support a first end of a filter member disposed about an exterior of the conduit member, wherein an inner surface of the filter member and an exterior surface of the conduit member are in a spaced relationship to define a first area. The first area is in fluid communication with the receiving area, wherein fluid to be filtered flows into the inlet opening through the conduit into the receiving area then into the first area and through the filter member.

A fluid filter in accordance with another exemplary embodiment is provided. The fluid filter includes a conduit member having an inlet end and an outlet end. The fluid filter further includes a collection vessel secured to the outlet end. The collection vessel defines a receiving area and having an outlet opening for emptying debris from the receiving area. The collection vessel further comprises a cap for removably covering the outlet opening and the collection vessel further comprising a securement member secured to the conduit member. The securement member includes a plurality of tabs for receiving and engaging a first end portion of a filter member disposed about an exterior of the conduit member, wherein an inner surface of the filter member and an exterior surface of the conduit member are in a spaced relationship to define a first area. The first area is in fluid communication with the receiving area, wherein fluid to be filtered flows into the inlet opening through the conduit into the receiving area and then into said first area and through the filter member.

DETAILED DESCRIPTION OF EXEMPLARY EMBODIMENTS OF THE INVENTION

Figure 1:
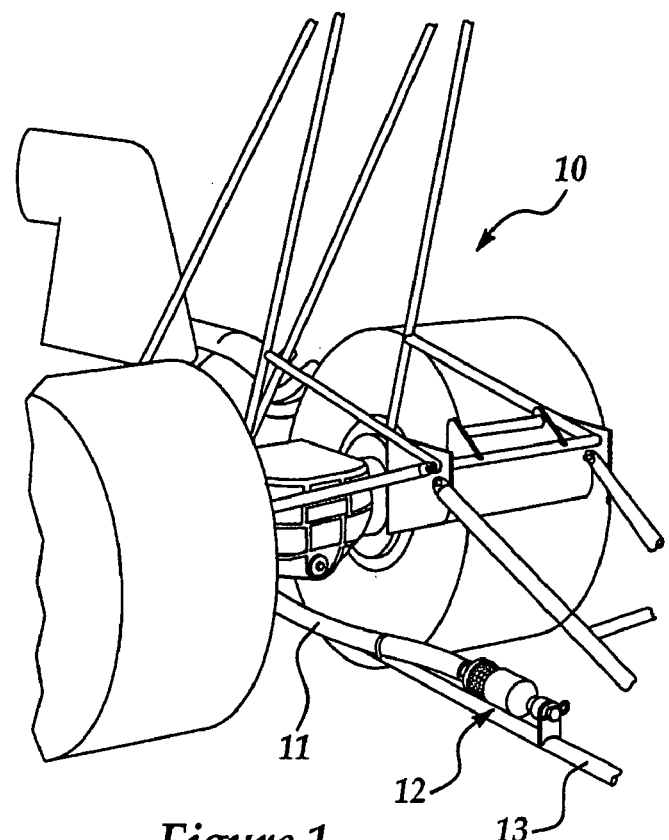
FIG. 1 is a partial perspective view of a back end of the racing car, showing a clutch filter in accordance with an exemplary embodiment.

Referring to FIG. 1, a back end of a racing car 10 is shown. The racing car 10 is equipped with a clutch dust transfer hose 11, which is connected at a front end to a vehicle clutch (not shown). A vehicle bell housing (not shown) is adapted to capture and direct friction material expelled from the clutch into the transfer hose 11.

A clutch filter 12 in accordance with an exemplary embodiment, is attached to the back end of the clutch dust transfer hose 11. In an exemplary embodiment, both the clutch dust transfer hose 11 and the clutch filter 12 are attached to a frame member 13 of the racing car 10. It should be understood that although the clutch filter 12 is utilized with the racing car 10, that the clutch filter 12 could be utilized with any other vehicle or device that utilizes a clutch where clutch dust is produced.

Figure 3:
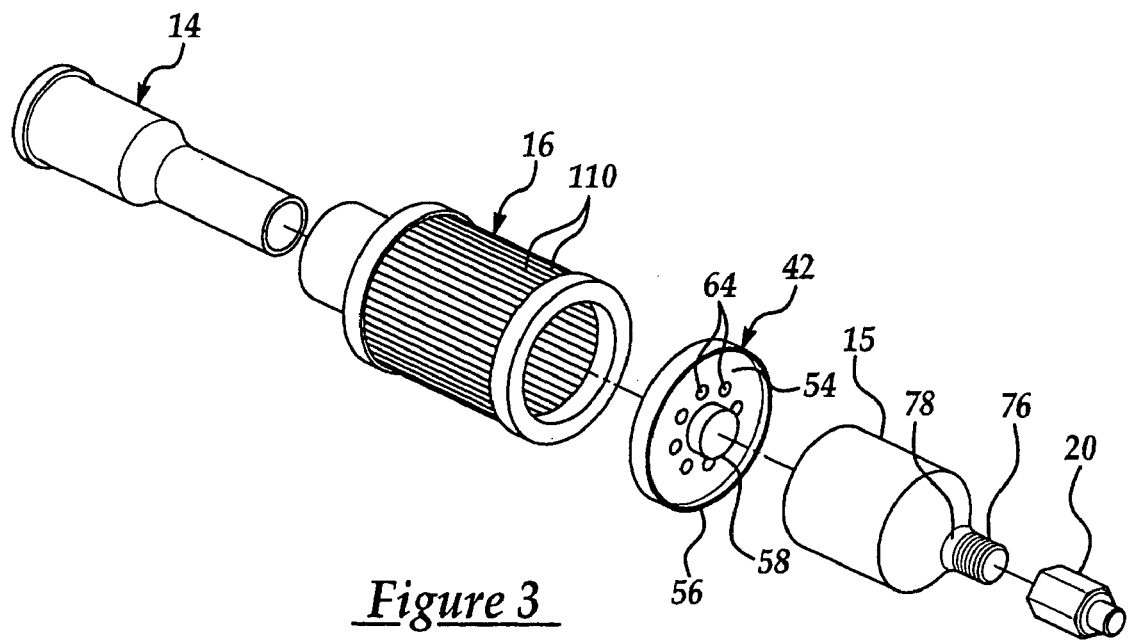
FIG. 3 is an exploded perspective view of the clutch filter of FIG. 2, showing the components thereof.
Figure 2:
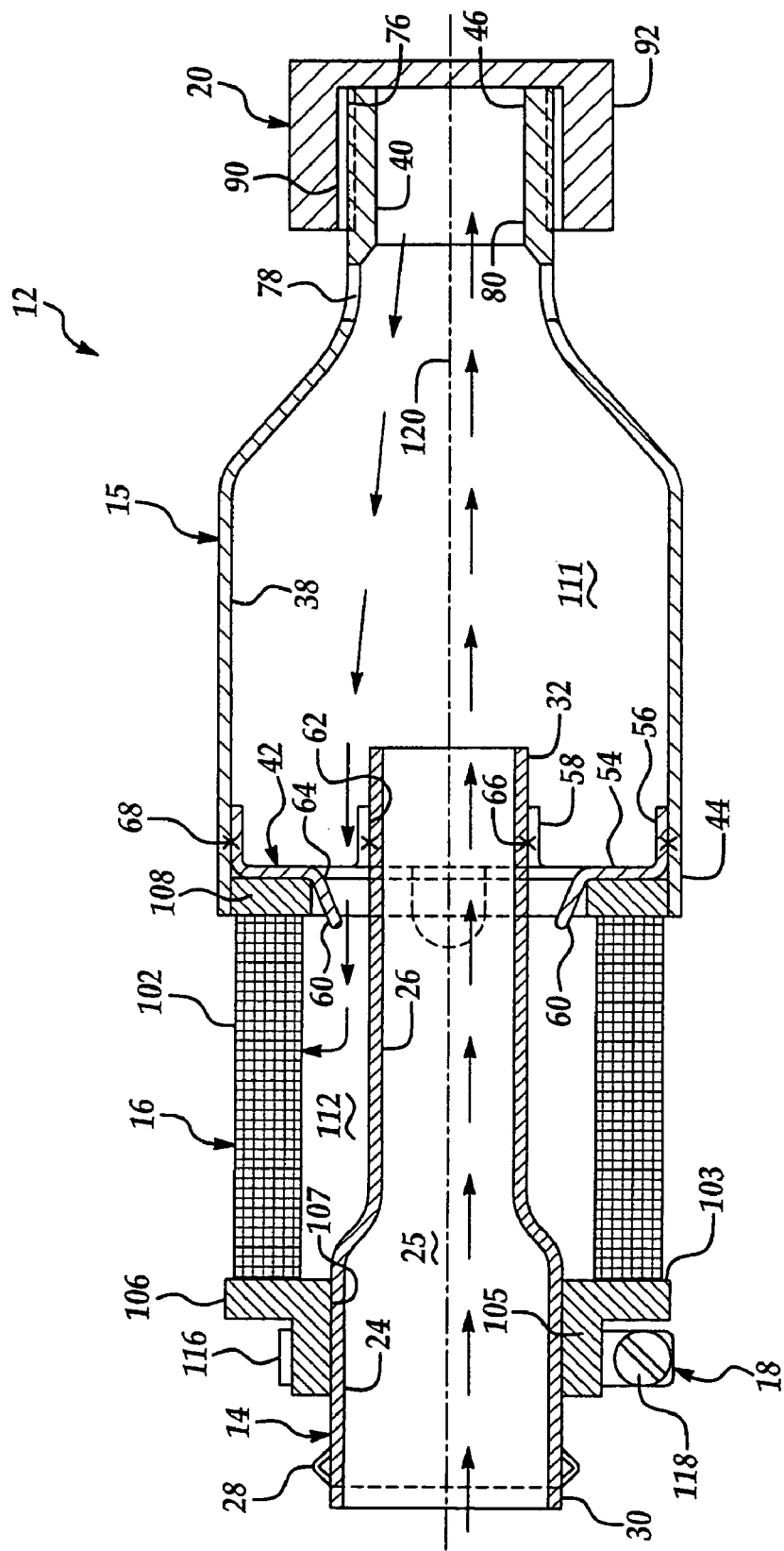
FIG. 2 is a cross-sectional view of a clutch filter in accordance with an exemplary embodiment.

Referring to FIGS. 2 and 3, the clutch filter 12 includes a conduit member 14, a collection vessel 15, a collection member 16, a hose clamp member 18, and an end cap 20. The conduit member 14 is provided to direct a fluid containing air and clutch dust from the transfer hose 11 into an interior of the clutch filter 12. The conduit member 14 is constructed from a metal, such as steel or aluminum, and is centered about an axis 120. In an alternate embodiment, the conduit member 14 could be constructed from a high-temperature plastic. In an exemplary embodiment, the conduit member 14 includes a conduit portion 24 coupled to a conduit portion 26 both of which define a passageway 25. The diameter of the conduit portion 24 is larger than the conduit portion 26 and the portion 24 has a predetermined diameter for receiving the transfer hose 11. The conduit member 14 further includes an inlet end 30, an outlet end 32, and a sealing tab 28 that extends around a circumference of the inlet end 30. The sealing tab 28 has a diameter that is slightly larger than an interior diameter of an aperture in the hose 11. Thus, sealing tab 28 can be fixedly attached to the hose 11. Further, in an alternate embodiment of clutch filter 12, the clamp 18 can be removed from the clutch filter 12 and the filter member 16 can be fixedly held against the mounting plate 42 by an end of the hose 11.

The collection vessel 15 is operably coupled to the conduit member 14 for receiving a fluid containing air and the clutch dust and for storing the clutch dust. The collection vessel 15 is constructed from a metal such as steel or aluminum. In an alternate embodiment, the collection vessel 15 could be constructed from a high-temperature plastic. In an exemplary embodiment, the collection vessel 15 includes a first vessel portion 38 coupled to a second vessel portion 40 that jointly define an interior area 111. The collection vessel 15 further includes a first end 44, a second end 46, and a mounting plate 42 disposed within an opening defined by the first end 44.

The mounting plate 42 includes an annular plate 54 coupled to an outer annular flange 56 that extends around the circumference of the annular plate 54. The diameter of the outer annular flange 56 is substantially equal to an inner diameter of the vessel portion 38 in order for the outer annular flange 56 to be welded to an interior of the portion 38. In an exemplary embodiment, a plurality of weld joints 68 fixedly attach the outer annular flange 56 to the vessel portion 38 of collection vessel 15. The mounting plate 42 further includes an inner annular flange 58 that extends axially from the plate 54 toward the second end 46 of collection vessel 15 and defines an aperture 62 for receiving the outlet end 32 of the conduit member 14. In an exemplary embodiment, a plurality of weld joints 66 fixedly attach the inner annular flange 58 to the outlet end 32 of conduit member 14. The mounting plate 42 further includes a plurality of support tabs 60 that extend axially from the annular plate 54 toward the inlet end of the conduit member 14, in a direction opposite of the inner annular flange 58. The plurality of support tabs 60 extend circumferentially around the inner annular flange 58 and are constructed by punching a portion of the material of annular plate 54 outwardly from the annular plate 54. Thus, by forming the plurality of support tabs 60, a plurality of apertures 64 are formed that extend through the annular plate 54 for allowing air to pass from the interior area 111 through the apertures 64 to the interior area 112. Further, the plurality of support tabs 60 are configured to receive an end cap 108 of the filter member 16, which will be described in greater detail below.

The portion 40 defines an aperture 80 for allowing clutch dust to be removed from collection vessel 15. In an exemplary embodiment, the portion 40 is closed off utilizing the end cap 20. The vessel portion 40 includes a plurality of surfaces 78 extending circumferentially around an exterior of portion 40 to allow a tool (not shown) to engage the surfaces for removing the end cap 20 from the portion 40. The vessel portion 40 further includes threads 76 extending circumferentially around portion 40. The threads 76 engage internal threads 90 within the end cap 20 for affixing to the end cap 20 to the portion 40.

As discussed above, the end cap 20 is provided to close off the aperture 80 of the collection vessel 15. The end cap 20 is generally cup-shaped and is constructed from a metal. In an alternate embodiment, the end cap 20 is constructed from a high-temperature plastic. The end cap 20 includes inner threads 90 configured to engage threads 76 of the vessel portion 40. When a user desires to empty accumulated dust out of the collection vessel 15, the end cap 20 can be removed, using appropriate tools, such as a wrench, and the vessel can then be emptied out.

The filter member 16 is provided to filter or trap any clutch dust that contacts the filter member 16. The filter member 16 is further provided to be both easily attachable and detachable from the conduit member 14 and the collection vessel 15. The filter member 16 includes a filter media 102, a first annular end cap 106, and a second annular end cap 108.

The filter media 102 is substantially cylindrically shaped and comprises a plurality of pleated portions 110 extending circumferentially about the axis 120. The pleated portions 110 are formed from a stainless steel screen that trap particulate solids 150 microns in diameter or greater. Of course, the pleated portions 110 could be configured to trap particulate solids less than 150 microns. In an alternate embodiment, the filter media could comprise any foraminous material capable of trapping clutch dust. For example, the filter media could comprise one or more layers of woven stainless steel, woven cotton, or sintered fibers including copper and steel. Further, for example, the filter media could comprise one or more layers of polymeric fibers such as polypropylene.

The end caps 106, 108 are constructed from a polymeric material. In an alternate embodiment, the end caps 106, 108 could be constructed from a high-temperature rubber. The end cap 108 is fixedly attached to a first end of the filter media 102 and is substantially ring-shaped. The end cap 108 is further configured to be received within a space defined by an outer wall of vessel portion 38 and the plurality of support tabs 60. The end cap 106 is fixedly attached to a second end of the filter media 102. The end cap 106 includes ring-shaped base portion 105 defining an aperture 107 having a diameter substantially equal to an outer diameter of the conduit portion 24. The end cap 106 further includes an annular flange 103 extending radially outwardly from the base portion 105. The annular flange 103 is fixedly attached to the filter media 102.

When installing the filter member 16, the filter member 16 is slid onto conduit member 14 over the inlet end such that filter member 16 is disposed around the conduit member 14. When sliding the filter member 16 on the conduit member 14, the end cap 108 is moved adjacent the mounting plate 42 and is supported by the support tabs 60. Further, the end cap 106 is disposed around the conduit portion 24 and is supported by the conduit portion 24. In an exemplary embodiment, a hollow interior region 112 is defined between the conduit portion 26 and an inner surface of the filter member 16. The hollow interior region 112 communicates with the interior region 111 of the collection vessel 15 via the plurality of apertures 64 in the mounting plate 42.

Referring to FIG. 2, the hose clamp member 18 is provided to fixedly hold the filter member 16 to the conduit member 14. The hose clamp member 18 includes a metal ring 116 that extends circumferentially around the base portion 105 of the end cap 106. The hose clamp member 118 further includes a screw 118 utilized to tighten the metal ring 116 about the base portion 105 to prevent movement of the filter member 16 relative to the collection vessel 15.

When removing the filter member 16, the hose 11 is pulled away from the sealing tab 28 and the hose clamp member 18 is loosened and slid off of the end 30. Thereafter, the filter member 16 can be slid over the sealing tab 28 and the end 30 to remove the filter member 16.

When the clutch filter 12 is receiving a fluid containing air and clutch dust from the transfer hose 11, the fluid flows through the conduit member 14 into the collection vessel 15. After the fluid enters the collection vessel, the air component of the fluid is able to make a sharp turn, roughly 180 degrees, around the end of the conduit member 14, as shown by the arrow in FIG. 2. The air is then able to enter the hollow annular space 112 between the conduit member 14 and the filter element 16. Then, the air passes radially outwardly through the filter member 16 to the surroundings. However, when the air stream reverses directions at the interior end of the conduit member 14, most of the clutch dust (not shown) is not able to reverse direction, but instead, the dust drops out of the air stream, and is deposited at the portion 40 of the collection vessel 15. Further, any fine dust particles that do make it into the area 112 are then filtered out by the filter member 16.

The clutch filter for filtering a fluid containing air and particulate solids, represents a substantial improvement over other systems. In particular, the clutch filter reduces and/or minimizes the uncontrolled release of clutch dust from racing car clutches into the environment. Further, the clutch filter includes a filter member that can be easily replaced when the filter member becomes substantially filled with clutch dust.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed for carrying out this invention, but that the invention will include all embodiments falling within the scope of the appended claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A clutch filter for filtering a fluid having particulate solids from a clutch, comprising:
   a conduit member having an inlet end and an outlet end;
   a filter member configured to be removably disposed about an exterior of the conduit member wherein an inner surface of the filter member and an exterior surface of the conduit member are in a spaced relationship; and
   a collection vessel coupled to the outlet end of the conduit member, the collection vessel defining a first area in fluid communication with the outlet end, a second area being defined between the inner surface of the filter member and the exterior surface of the conduit member that is in fluid communication with the first area, a portion of the exterior surface of the filter member not being covered by the collection vessel, wherein the collection vessel is configured to induce the fluid passing into the inlet end of the conduit member to change a fluid flow direction in the first area from a first direction to a second direction substantially opposite the first direction so that a portion of the particulate solids in the fluid from the clutch is deposited in the first area before the fluid passes through the filter member.

2. The clutch filter of claim 1, wherein the filter member comprises a substantially cylindrical filter media that has a portion radially spaced away from the conduit member to allow the fluid to pass therebetween.

3. The clutch filter of claim 2, wherein the filter member comprises first and second end caps disposed on first and second ends, respectively, of the filter media.

4. The clutch filter of claim 3, wherein the first and second end caps comprise polymeric end caps.

5. The clutch filter of claim 3, wherein the first end cap is disposed proximate an inlet end of the conduit member around the conduit member, the clutch filter further comprising an attachment clamp for clamping the first end cap to the conduit member.

6. The clutch filter of claim 3, wherein the collection vessel comprises an attachment member having at least two flanges configured to receive the second end cap of the filter member.

7. The clutch filter of claim 6, wherein the attachment member further comprises an aperture extending therethrough configured to receive a portion of the conduit member therein.

8. The clutch filter of claim 7, wherein the attachment member further comprises an extrusion extending around the aperture that is fixedly attached proximate an outlet end of the conduit member.

9. The clutch filter of claim 1, wherein the filter member comprises a pleated filter media.

10. The clutch filter of claim 9, wherein the pleated filter media substantially surrounds an exterior surface of the filter member.

11. The clutch filter of claim 1, wherein the filter member comprises a stainless steel screen.

12. The clutch filter of claim 1, wherein the filter member is configured to trap particulate solids in the fluid that are 150 microns in diameter or greater.

13. The clutch filter of claim 1, wherein the collection vessel has a removable cap member to allow the particulate solids in the fluid deposited therein to be emptied.

14. A clutch filter for filtering a fluid having particulate solids from a clutch, comprising:
a conduit member having an inlet end and an outlet end;
a filter member having a substantially cylindrical filter media wherein the filter media is configured to be removably disposed about an exterior of the conduit member wherein an inner surface of the filter media and an exterior surface of the conduit member are in a spaced relationship;
a collection vessel coupled to the outlet end of the conduit member, the collection vessel defining a first area in fluid communication with the outlet end, a second area being defined between the inner surface of the filter member and the exterior surface of the conduit member that is in fluid communication with the first area, a portion of the exterior of the filter member not being covered by the collection vessel, wherein the collection vessel is configured to induce the fluid passing into the inlet end of the conduit member to change a fluid flow direction in the first area from a first direction to a second direction substantially opposite the first direction so that a portion of the particulate solids in the fluid from the clutch is deposited in the first area before the fluid passes through the filter member; and
an attachment means for fixedly attaching the filter member to the conduit member.

15. The clutch filter of claim 14, wherein the filter member comprises first and second end caps disposed on first and second ends, respectively, of the filter media.

16. The clutch filter of claim 15, wherein the first and second end caps comprise polymeric end caps.

17. The clutch filter of claim 14, wherein the filter member comprises a pleated filter media.

18. The clutch filter of claim 14, wherein the filter member comprises a stainless steel screen.

19. A method for installing a filter member in a clutch filter, the clutch filter being configured for filtering a fluid having particulate solids from a clutch, the clutch filter having a conduit member with an inlet end and an outlet end, the clutch filter further having a collection vessel coupled to the outlet end of the conduit member, the collection vessel having a first area in fluid communication with the outlet end, and a second area between an inner surface of the filter member and an exterior surface of the conduit member in fluid communication with the first area, the method comprising:

disposing the filter member about the exterior surface of the conduit member in a spaced relationship, wherein a portion of an exterior surface of the filter member is not covered by the collection vessel, and the collection vessel being configured to induce the fluid passing into the inlet end of the conduit member to change a fluid flow direction in the first area from a first direction to a second direction substantially opposite the first direction so that a portion of the particulate solids in the fluid from the clutch is deposited in the first area before the fluid passes through the filter member; and
affixing the filter member to the conduit member proximate the inlet end of the conduit member.

20. A fluid filter for filtering a fluid having particulate solids from a clutch, comprising:
a conduit member having an inlet end and an outlet end;
a collection vessel secured to the outlet end, the collection vessel defining a receiving area, the receiving area being in fluid communication with the conduit member; and
at least one supporting member depending away from the collection vessel, the at least one supporting member being configured and positioned to support a first end of a filter member disposed about an exterior of the conduit member, wherein an inner surface of the filter member and an exterior surface of the conduit member are in a spaced relationship to define a first area, the first area being in fluid communication with the receiving area, wherein the fluid to be filtered flows into the inlet end of the conduit member and into the receiving area, the collection vessel being configured to induce the fluid to change a fluid flow direction in the receiving area from a first direction to a second direction substantially opposite the first direction so that a portion of the particulate solids in the fluid from the clutch is deposited in the receiving area before the fluid passes through the filter member.

21. The fluid filter of claim 20, wherein the at least one supporting member comprises a tab portion.

22. The fluid filter of claim 20, wherein a second end of the filter member is sealingly engaged to a portion of the conduit member.

23. The fluid filter of claim 22, wherein the portion of the conduit member has a larger dimension than the outlet end.

24. The fluid filter of claim 23, wherein the portion of the conduit member directs fluid passing though the first area towards the inner surface of the filter member.

25. The fluid filter of claim 20, wherein the inlet end is configured to be connected to and in fluid communication with a clutch housing for receipt of the fluid from the clutch housing.

26. The fluid filter of claim 25, wherein the fluid from the clutch housing is filtered by the filter member.

27. The fluid filter of claim 20, wherein the filter member is secured between a conduit coupled to the clutch housing and the at least one supporting member.

28. The fluid filter of claim 20, wherein the filter member is installed onto the fluid filter by sliding the filter member over the inlet end and then axially along the conduit member until the first end is engaged by the at least one supporting member.

29. The fluid filter of claim 20, wherein the second end of the filter member comprises an elastomeric end cap portion defining an inner opening slightly smaller than the exterior configuration of a portion of the conduit member.

30. The fluid filter of claim 20, wherein the at least one securing member and the collection vessel define a receiving portion configured to receive and engage an elastomeric end cap disposed on the first end of the filter member.

31. The fluid filter of claim 20, wherein the collection vessel further comprises an outlet opening and a cap configured to be removably secured to the outlet opening.

32. A fluid filter for filtering a fluid having particulate solids from a clutch, comprising:

a conduit member having an inlet end and an outlet end; and a collection vessel secured to the outlet end, the collection vessel defining a receiving area and having an outlet opening for emptying debris from the receiving area, the collection vessel further comprising a cap for removably covering the outlet opening and the collection vessel further comprising a securement member secured to the conduit member, the securement member having a plurality of tabs for receiving and engaging a first end portion of a filter member disposed about an exterior of the conduit member, wherein an inner surface of the filter member and an exterior surface of the conduit member are in a spaced relationship to define a first area, the first area being in fluid communication with the receiving area, wherein the fluid to be filtered flows into the inlet end of the conduit member and into the receiving area, the collection vessel being configured to induce the fluid to change a fluid flow direction in the receiving area from a first direction to a second direction substantially opposite the first direction so that a portion of the particulate solids in the fluid from the clutch is deposited in the receiving area before the fluid passes through the filter member.

33. The fluid filter of claim 32, wherein the securement member comprises a plurality of openings for providing fluid communication between the first area and the receiving area.

34. The fluid filter of claim 33, wherein the plurality of openings are defined by the plurality of tabs.

* * * * *